United States Patent
Chae et al.

(10) Patent No.: US 8,884,591 B2
(45) Date of Patent: Nov. 11, 2014

(54) CONTROL CIRCUIT FOR DISCONTINUOUS CONDUCTION MODE POWER FACTOR CORRECTION CONVERTER USING HARMONIC MODULATION

(71) Applicant: Mando Corporation, Pyeongtaek-si (KR)

(72) Inventors: Hyung Jun Chae, Seoul (KR); Jun Young Lee, Yongin-Si (KR); Kyung Dong Kim, Chungcheongnam-do (KR); Hyung Tae Moon, Seoul (KR)

(73) Assignee: Mando Corporation, Gyeonggi-Do (KR)

( * ) Notice: Subject to any disclaimer, the term of this patent is extended or adjusted under 35 U.S.C. 154(b) by 49 days.

(21) Appl. No.: 13/852,104

(22) Filed: Mar. 28, 2013

(65) Prior Publication Data

US 2013/0258727 A1    Oct. 3, 2013

(30) Foreign Application Priority Data

Mar. 28, 2012    (KR) .................. 10-2012-0031787

(51) Int. Cl.
 *H02M 1/42*    (2007.01)
 *H02M 1/12*    (2006.01)
 *H02M 3/156*    (2006.01)

(52) U.S. Cl.
 CPC ............... *H02M 1/12* (2013.01); *Y02B 70/126* (2013.01); *H02M 1/4225* (2013.01)
 USPC .............................. 323/207; 323/285; 363/89

(58) Field of Classification Search
 USPC ................. 323/205, 207, 222, 282, 283, 285; 363/39, 89
 See application file for complete search history.

(56) References Cited

U.S. PATENT DOCUMENTS

| | | | | |
|---|---|---|---|---|
| 7,102,341 | B1 * | 9/2006 | Choudhury | 323/285 |
| 7,148,664 | B2 * | 12/2006 | Takahashi et al. | 323/222 |
| 8,130,522 | B2 * | 3/2012 | Maksimovic | 363/89 |
| 8,179,703 | B2 * | 5/2012 | Uno | 363/44 |
| 2008/0315852 | A1 * | 12/2008 | Jayaraman et al. | 323/285 |
| 2013/0221936 | A1 * | 8/2013 | Ku et al. | 323/205 |

OTHER PUBLICATIONS

German Office Action, w/ English translation thereof, issued in German Patent Application No. DE 102013004973.3 dated Sep. 25, 2013.
K. Yao et al., "DCM Boost PFC Converter with High Input PF," Applied Power Electronics Conference and Exposition (APEC), 2010 Twenty-Fifth Annual IEEE Digital Object Identifier; pp. 1405-1412.

* cited by examiner

*Primary Examiner* — Gary L Laxton
(74) *Attorney, Agent, or Firm* — McDermott Will & Emery LLP

(57) ABSTRACT

A control circuit for a discontinuous conduction mode power factor correction converter using harmonic modulation includes: a first difference circuit configured to calculate and output a difference between an output voltage of a discontinuous conduction mode power factor correction converter and a reference voltage; a PI converter configured to perform a proportional integral control on an output signal of the first difference circuit, and output a signal having an arbitrary duty ratio; a second difference circuit configured to output a difference between a rectified input voltage, which is input to the discontinuous conduction mode power factor correction converter, and a harmonic modulation factor DC voltage; and a multiplication circuit configured to multiply an output of the PI controller and an output of the second difference circuit, and output a PFC control signal to a switch of the discontinuous conduction mode power factor correction converter.

4 Claims, 3 Drawing Sheets

(a)

(b)

CONTROL CIRCUIT FOR DISCONTINUOUS CONDUCTION MODE POWER FACTOR CORRECTION CONVERTER USING HARMONIC MODULATION

CROSS-REFERENCE(S) TO RELATED APPLICATION

This application claims priority of Korean Patent Application No. 10-2012-0031787, filed on Mar. 28, 2012, in the Korean Intellectual Property Office, which is hereby incorporated by reference in its entirety.

BACKGROUND OF THE INVENTION

1. Field of the Invention

The present invention relates to a control circuit for a discontinuous conduction mode power factor correction converter using harmonic modulation, and more particularly, to a control circuit for a discontinuous conduction mode power factor correction converter using harmonic modulation, which improves a power factor and an inductor current in a discontinuous conduction mode power factor correction converter by using harmonic modulation with respect to the discontinuous conduction mode power factor correction converter.

2. Description of the Related Art

A power factor correction (PFC) circuit is used for reducing harmonics on a power line. In particular, the PFC circuit includes an accessory load so that the circuit substantially appears as a pure resistive load. The purpose of the PFC circuit is to make AC voltage and current become substantially in-phase. This improves efficiency and removes the generation of harmful harmonics.

For example, the PFC circuit operates in a frequency range from tens of kHz to hundreds of kHz, and enables a wide-range variation in input power supply and load. Therefore, the PFC circuit can suppress most of harmonic distortion and have unity power factor.

A basic circuit configuration of a DC/DC converter may be classified into six basic types according to relative positions of an inductor and an active switch: a buck converter, a boost converter, a buck-boost converter, a Cuk converter, a SEPIC converter, and a Zeta converter. The boost and buck-boost circuit configurations are suitable for execution of PFC.

Since the inductor can operate in a continuous conduction mode (CCM) or a discontinuous conduction mode (DCM), high power factor correction can be achieved. In the same output power, the inductor operating in the DCM has a larger peak current than the inductor operating in the CCM. Since power becomes higher and peak current becomes larger, the switching loss of the circuit is increased.

Thus, the CCM is suitable for high power output. However, when the inductor operates in the CCM, a control circuit needs to detect a relationship of an input voltage, an inductor current, and an output voltage in real time. Therefore, the circuit becomes complicated. In addition, a switching frequency and a duty ratio of a switch need to change constantly in each cycle of an input voltage.

When it is necessary to integrate the PFC circuit and the two-stage converter in a single-stage structure, switching elements of the PFC circuit and the two-stage converter should have the same switching frequency and duty ratio.

Therefore, when the PFC circuit operates in the CCM, the PFC circuit is unsuitable for integration into the two-stage converter. On the contrary, in the buck-boost PFC converter, in case where the switching frequency and the duty ratio of the switching element are constantly maintained at each input power supply period, the PFC function can be easily achieved when the inductor operates in the DCM.

SUMMARY OF THE INVENTION

An aspect of the present invention is directed to provide a control circuit for a discontinuous conduction mode power factor correction converter using harmonic modulation, which improves a power factor and an inductor current in a discontinuous conduction mode power factor correction converter by using harmonic modulation with respect to the discontinuous conduction mode power factor correction converter.

According to an embodiment of the present invention, a control circuit for a discontinuous conduction mode power factor correction converter using harmonic modulation includes: a first difference circuit configured to calculate and output a difference between an output voltage of a discontinuous conduction mode power factor correction converter and a reference voltage; a PI converter configured to perform a proportional integral control on an output signal of the first difference circuit, and output a signal having an arbitrary duty ratio; a second difference circuit configured to output a difference between a rectified input voltage, which is input to the discontinuous conduction mode power factor correction converter, and a harmonic modulation factor DC voltage; and a multiplication circuit configured to multiply an output of the PI controller and an output of the second difference circuit, and output a PFC control signal to a switch of the discontinuous conduction mode power factor correction converter.

A magnitude of the harmonic modulation factor DC voltage may be $1+K/2$ (where K is a maximum value of a magnitude of the rectified input voltage).

The output of the second difference circuit may have a value in a range from $1-K/2$ to $1+K/2$.

The PFC control signal may be a result value to which a duty ratio of the output of the PI controller and a harmonic modulation factor of the output of the second difference circuit are reflected.

DESCRIPTION OF REFERENCE NUMERALS

Figure 1:
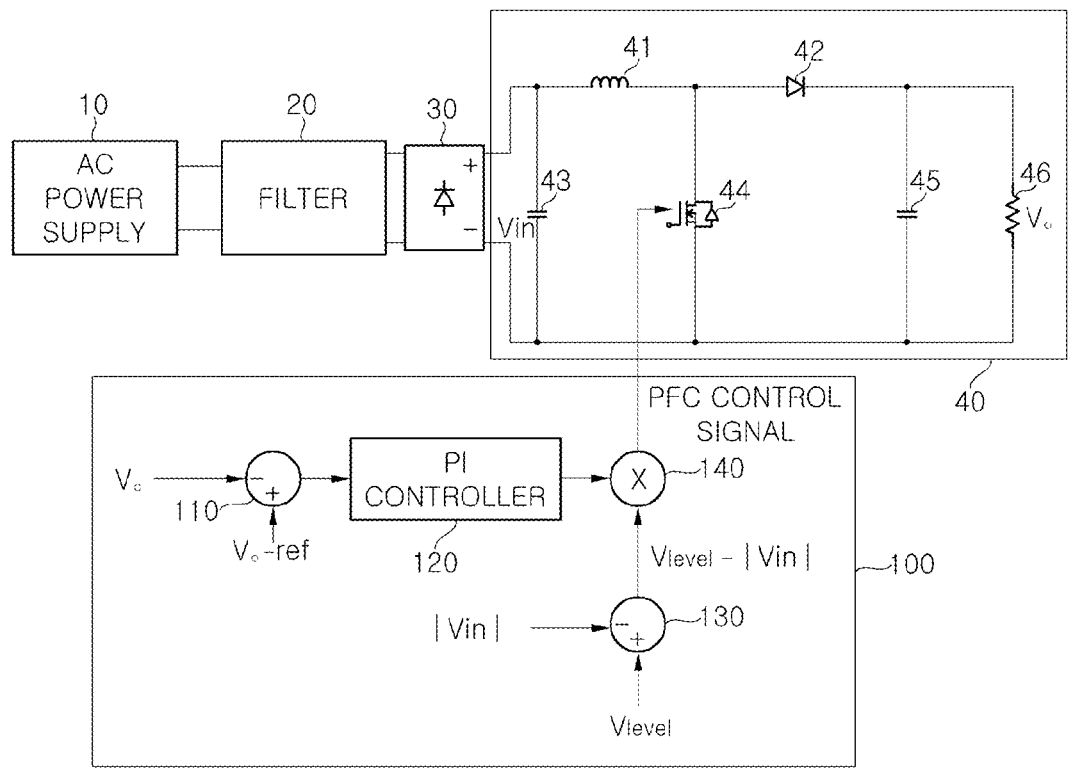
FIG. 1 is a diagram for describing a control circuit for a DCM PFC converter using harmonic modulation according to an embodiment of the present invention.

| | |
|---|---|
| 10: AC power supply | 20: filter |
| 30: rectifier | 40: PFC converter |

| | |
|---|---|
| 41: boost inductor | 42: boost diode |
| 43: input capacitor | 44: PFC switch |
| 45: output capacitor | 46: output load |
| 100: PFC control circuit | 110: first difference circuit |
| 120: PI controller | 130: second difference circuit |
| 140: multiplication circuit | |

DETAILED DESCRIPTION OF EXEMPLARY EMBODIMENTS

Exemplary embodiments of the present invention will be described below in detail with reference to the accompanying drawings. These embodiments are provided so that this disclosure will be thorough and complete, and will fully convey the scope of the invention to those skilled in the art. The invention may, however, be embodied in many different forms and should not be construed as being limited to the embodiments set forth herein. In the drawings, the widths, lengths and thicknesses of elements may be exaggerated for clarity. Throughout the drawings and description, like reference numerals will be used to refer to like elements.

FIG. 1 is a diagram for describing a control circuit for a DCM PFC converter using harmonic modulation according to an embodiment of the present invention.

Referring to FIG. 1, the control circuit for the DCM PFC converter includes an AC power supply 10, a filter 20, a rectifier 30, a PFC converter 40, and a PFC control circuit 100 for controlling the PFC converter 40.

The filter 20 is implemented with a filter inductor and a filter capacitor, and may be used for removing high-frequency components from an input current of the converter. The input current has a low-frequency form because of a wave having the same phase as the input voltage.

The rectifier 30 is implemented with at least one rectifier. For example, the rectifier 30 may be a full-bridge rectification circuit implemented with four diodes. It is apparent that other types of rectification circuits can also be used. The rectifier 30 may be implemented with various elements, such as BJTs, MOSFETs, and SCRs, as well as diodes.

The PFC converter 40 may include a boost inductor 41, a boost diode 42, an input capacitor 43, a PFC switch 44, an output capacitor 45, and an output load 46.

The boost inductor 41 is connected to one terminal of the rectifier 30 and receives a rectified voltage from the rectifier 30. The PFC switch 44 is connected in series to the boost inductor 41, and both output terminals of the rectifier 30 are connected to the boost inductor 41. The boost diode 42 is connected in series to the boost inductor 41. The input capacitor 43 is connected to both output terminals of the rectifier 30 at the front stage of the boost inductor 41, and the output capacitor 45 is connected to a cathode of the boost diode 42.

The PFC control circuit 100 may include a first difference circuit 110, a PI controller 120, a second difference circuit 130, and a multiplication circuit 140.

The first difference circuit 110 calculates and outputs a difference between an output voltage of the DSM PFC converter and a reference voltage.

The PI controller 120 performs a proportional integral control on the output signal of the first difference circuit 110, and outputs a signal having an arbitrary duty ratio.

The second difference circuit 130 outputs a difference between a rectified input voltage, which is input to the DCM PFC converter 40, and a harmonic modulation factor DC voltage.

The multiplication circuit 140 multiplies the output of the PI controller 120 and the output of the second difference circuit 130, and outputs a PFC control signal to the PFC switch 44 of the DCM PFC converter 40.

The PFC control signal output from the multiplication circuit 140 is a result value to which the duty ratio of the output of the PI controller 120 and the harmonic modulation factor of the output of the second difference circuit 130 are reflected.

The magnitude of the harmonic modulation factor DC voltage input to the second difference circuit 130 is 1+K/2. Herein, K represents a maximum value of the magnitude of the rectified input voltage. Therefore, the output of the second difference circuit 130 may have a value in a range from 1−K/2 to 1+K/2.

Figure 2:
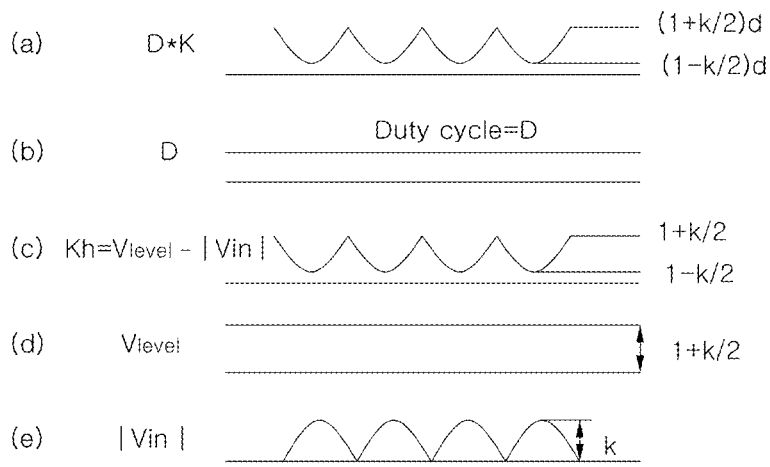
FIG. 2 is a diagram for describing the operation of the control circuit for the DCM PFC converter using harmonic modulation according to the embodiment of the present invention.

FIG. 2 is a diagram for describing the operation of the control circuit for the DCM PFC converter using harmonic modulation according to the embodiment of the present invention.

Referring to FIGS. 1 and 2, the first difference circuit 110 receives the output voltage $V_o$ applied to the output load 46 of the PFC converter 40 and the reference voltage Vo−ref. The difference between the reference voltage Vo−ref and the output voltage Vo is output from the first difference circuit 110 and is input to the PI controller 120. The PI controller 120 receives the difference between the reference voltage Vo−ref and the output voltage Vo from the first difference circuit 110, performs the proportional integral control, and outputs the resultant signal to the multiplication circuit 140. The signal output from the PI controller 120 has an arbitrary duty ratio D. The waveform of the output signal of the PI controller 120 is illustrated in FIG. 2B.

On the other hand, the second difference circuit 130 receives the harmonic modulation factor DC voltage $V_{level}$ and the rectified input voltage $|V_{in}|$, which is input to the PFC converter 40 through the rectifier 30.

The rectified input voltage $|V_{in}|$ is illustrated in FIG. 2E, and the harmonic modulation factor DC voltage $V_{level}$ is illustrated in FIG. 2D.

The magnitude of the harmonic modulation factor DC voltage $V_{level}$ input to the second difference circuit 130 is 1+K/2. Herein, K represents the maximum value $|V_{in}|$ of the magnitude of the rectified input voltage. Therefore, the output of the second difference circuit 130 may have a value in a range from 1−K/2 to 1+K/2. The output of the second difference circuit 130 is illustrated in FIG. 2C.

The multiplication circuit 140 receives the output of the PI controller 120 and the output of the second difference circuit 130. The output of the PI controller 120 and the output of the second difference circuit 130 are multiplied by the multiplication circuit 140, and the resultant signal is output to the PFC switch 44 of the PFC converter 40 as the PFC control signal. The PFC control signal output from the multiplication circuit 140 is illustrated in FIG. 2A.

The PFC control signal output from the multiplication circuit 140 is a result value to which the duty ratio D of the output of the PI controller 120 and the harmonic modulation factor Kh of the output of the second difference circuit 130 are reflected.

The peak current applied to the boost inductor 41 can be expressed as Equation (1) below.

$$|I_{ac}[n]| = V_{in}[n]V_o(Kh[n]D)^2 T_s/(2L(V_o - V_{in}[n])) \quad \text{Equation (1)}$$

where n represents the time, and D represents the duty ratio. Kh represents the harmonic modulation factor.

On the other hand, the peak current applied to the boost inductor by the conventional PFC control method, which reflects no harmonic modulation factor, can be expressed as Equation (2) below.

$$|I_{ac}[n]|=V_{in}[n]V_oD^2T_s/(2L(V_o-V_{in}[n])) \quad \text{Equation (2)}$$

Comparing Equations (1) and (2), it can be seen that the peak current is reduced according to the harmonic modulation factor Kh.

The harmonic modulation factor Kh of the output of the second difference circuit 130, which is obtained from Equation (1), can be expressed as Equation (3) below.

$$Kh[n] = \frac{V_oV_{in,DC}}{V_{in,rms}\sqrt{V_o^2 - V_oV_{in,DC}}}\sqrt{1 - \frac{\sqrt{2}V_{in,rms}}{V_o}|\sin\omega nT_s|} \quad \text{Equation (3)}$$

The maximum value of the harmonic modulation factor Kh the output of the second difference circuit 130 has can be expressed as Equation (4) below.

$$Kh_{max}=V_oV_{in,DC}/(V_{in,rms}\sqrt{V_o^2-V_oV_{in,DC}}) \quad \text{Equation (4)}$$

The minimum value of the harmonic modulation factor Kh the output of the second difference circuit 130 has can be expressed as Equation (5) below.

$$Kh_{min}=Kh_{max}\sqrt{1-\sqrt{2}V_{in,rms}/V_o} \quad \text{Equation (5)}$$

Figure 3:
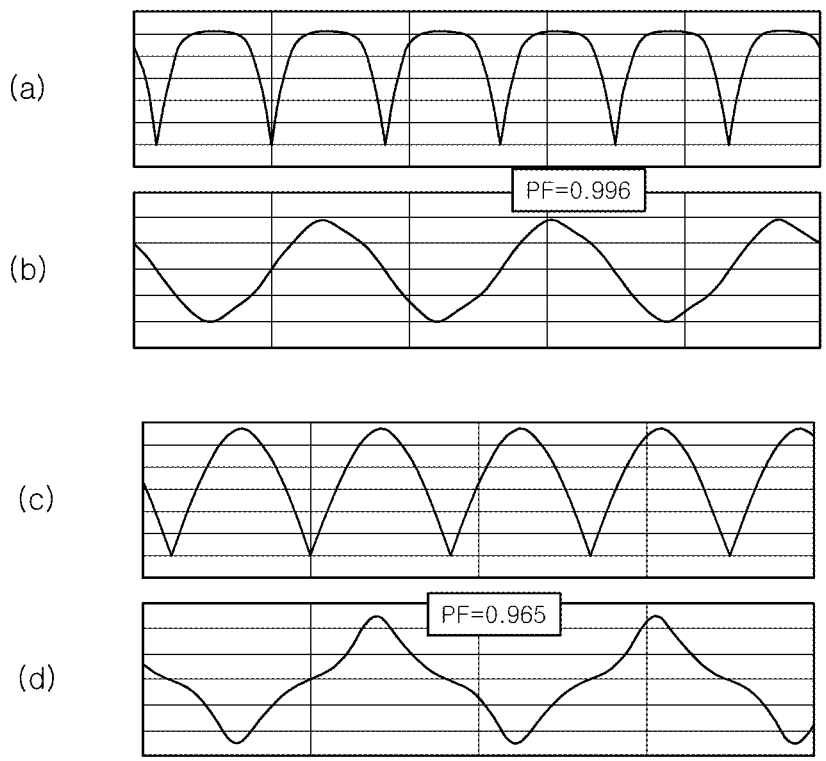
FIG. 3 is a diagram for describing improvement of an inductor current and an AC input current in a PFC converter by the control circuit for the DCM PFC converter using harmonic modulation according to the embodiment of the present invention.

FIG. 3 is a diagram for describing the improvement of the inductor current and the AC input current in the PFC converter by the control circuit for the DCM PFC converter using harmonic modulation according to the embodiment of the present invention.

Referring to FIG. 3, the waveform of the current flowing through the boost inductor 41 within the PFC converter 40 of the present invention is illustrated in FIG. 3A. The waveform of the AC input current applied to the PFC converter 40 of the present invention is illustrated in FIG. 3B. The PFC power factor (PF) of the PFC converter 40 is 0.996.

Meanwhile, the waveform of the current flowing through the boost inductor within the conventional PFC converter is illustrated in FIG. 3C. The waveform of the AC input current applied to the conventional PFC converter is illustrated in FIG. 3D. The PFC power factor (PF) of the PFC converter 40 is 0.965. That is, it can be seen that the PFC control method using harmonic modulation according to the present invention improves the PFC power factor (PF) of the PFC converter, as compared with the conventional PFC control method.

Referring to FIG. 3, it can be seen that the current peak waveform of the present invention illustrated in FIGS. 3A and 3B is reduced as compared with the conventional current peak waveform illustrated in FIGS. 3C and 3D, and thus, the waveform becomes smoother.

Figure 4:
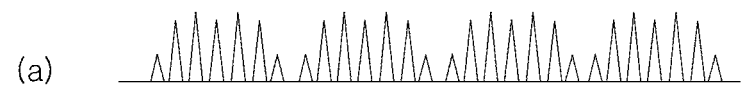
FIG. 4 is a diagram for describing improvement of an inductor current in the PFC converter by the control circuit for the DCM PFC converter using harmonic modulation according to the embodiment of the present invention.
Figure 4:
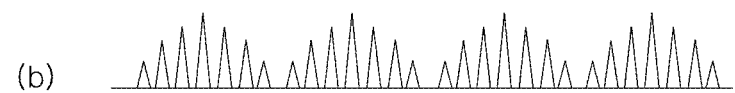

FIG. 4 is a diagram for describing the improvement of the inductor current in the PFC converter by the control circuit for the DCM PFC converter using harmonic modulation according to the embodiment of the present invention.

Referring to FIG. 4, it can be clearly seen that the current peak waveform of the present invention illustrated in FIG. 4A is reduced as compared with the conventional current peak waveform illustrated in FIG. 4B, so that the waveform becomes more smooth.

If the peak current flowing through the boost inductor is reduced, the size of the inductor can be reduced. A core of the inductor is determined by the product of a window area of the core and a cross-sectional area of the core. The window area of the core is reduced as the magnitude of the peak current is reduced.

According to the present invention, the peak current of the inductor in the DCM PFC converter is significantly reduced, and the power factor by the modulation of the inductor current can be ensured. Therefore, the effect of reducing the size of the inductor can be obtained.

While the embodiments of the present invention have been described with reference to the specific embodiments, it will be apparent to those skilled in the art that various changes and modifications may be made without departing from the spirit and scope of the invention as defined in the following claims.

What is claimed is:

1. A control circuit for a discontinuous conduction mode power factor correction converter using harmonic modulation, comprising:
    a first difference circuit configured to calculate and output a difference between an output voltage of a discontinuous conduction mode power factor correction converter and a reference voltage;
    a PI converter configured to perform a proportional integral control on an output signal of the first difference circuit, and output a signal having an arbitrary duty ratio;
    a second difference circuit configured to output a difference between a rectified input voltage, which is input to the discontinuous conduction mode power factor correction converter, and a harmonic modulation factor DC voltage; and
    a multiplication circuit configured to multiply an output of the PI controller and an output of the second difference circuit, and output a PFC control signal to a switch of the discontinuous conduction mode power factor correction converter.

2. The control circuit of claim 1, wherein a magnitude of the harmonic modulation factor DC voltage is 1+K/2 (where K is a maximum value of a magnitude of the rectified input voltage).

3. The control circuit of claim 2, wherein the output of the second difference circuit has a value in a range from 1−K/2 to 1+K/2.

4. The control circuit of claim 1, wherein the PFC control signal is a result value to which a duty ratio of the output of the PI controller and a harmonic modulation factor of the output of the second difference circuit are reflected.

* * * * *